(12) United States Patent
Jones

(10) Patent No.: US 6,431,521 B1
(45) Date of Patent: Aug. 13, 2002

(54) SILICON CARBIDE VALVE DISC FOR NUCLEAR REACTORS

(76) Inventor: Claude Ray Jones, Lanier Ford Shaver & Payne, P.C., P.O. Box 2087, Huntsville, AL (US) 35804

( * ) Notice: Subject to any disclaimer, the term of this patent is extended or adjusted under 35 U.S.C. 154(b) by 0 days.

(21) Appl. No.: 09/666,580

(22) Filed: Sep. 21, 2000

(51) Int. Cl.[7] .................................................. F16K 1/00
(52) U.S. Cl. ........................ 251/319; 251/84; 251/366; 251/368
(58) Field of Search ................................ 251/128, 319, 251/366, 368, 125, 84

(56) References Cited

U.S. PATENT DOCUMENTS

| | | | |
|---|---|---|---|
| 2,755,816 A | * | 7/1956 | Collins ........................ 137/496 |
| 3,739,983 A | * | 6/1973 | Jousson ....................... 239/101 |
| 4,372,531 A | | 2/1983 | Rollins et al. |
| 4,553,736 A | * | 11/1985 | Dellario ....................... 251/334 |
| 4,699,351 A | | 10/1987 | Wells |
| 4,774,963 A | * | 10/1988 | Ichikawa et al. ........... 128/763 |
| 4,922,949 A | | 5/1990 | Mizukusa et al. |
| 4,951,878 A | * | 8/1990 | Casey et al. ................ 293/462 |
| 5,048,790 A | | 9/1991 | Wells |
| 5,188,150 A | * | 2/1993 | Esplin ..................... 137/630.14 |
| 5,190,074 A | * | 3/1993 | Christopher ................ 137/495 |
| 5,375,813 A | * | 12/1994 | Rozinsky ..................... 251/333 |
| RE35,545 E | | 7/1997 | Chrysler |
| 5,671,722 A | * | 9/1997 | Moody ......................... 124/22 |
| 5,799,688 A | | 9/1998 | Yie |
| 5,823,510 A | | 10/1998 | Muramatsu et al. |
| 5,887,620 A | | 3/1999 | Niwa et al. |

* cited by examiner

Primary Examiner—Lesley D. Morris
Assistant Examiner—David A Bonderer
(74) Attorney, Agent, or Firm—Lanier Ford Shaver & Payne P.C.; Gerald M. Walsh

(57) ABSTRACT

The present invention is a directed to a main steam relief valve for use in a nuclear power plant. The valve disc includes a cylindrical first end of uniform external and internal circumference, a conical opposite end, an external surface, and an internal surface. The cylindrical first end preferably includes a plurality of groves on the external surface to prevent rotation of the disc. The conical portion is highly polished on the external surface to prevent the formation of cracks and is adapted to receive a push-rod on the internal surface and a valve seat on the external surface. The valve disc is constructed of approximately of 90% or greater silicon carbide.

28 Claims, 2 Drawing Sheets

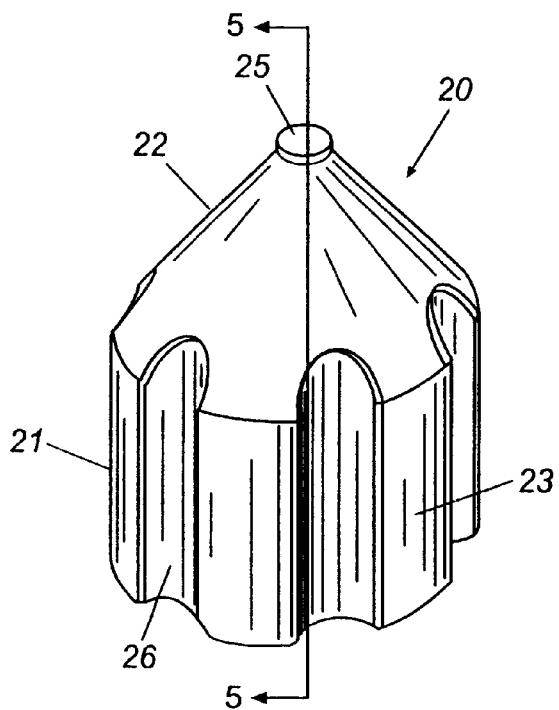
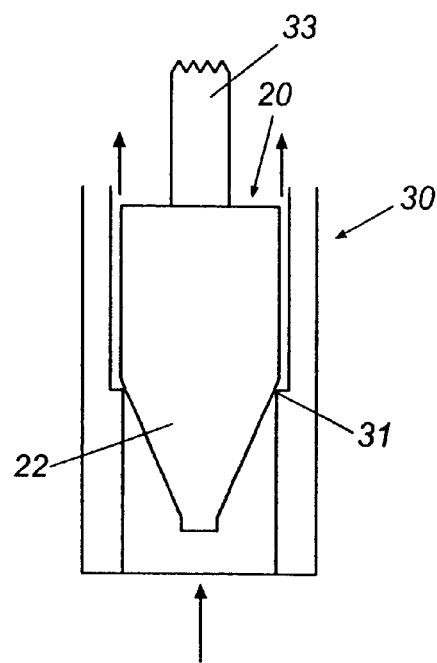
Fig. 2
Fig. 3
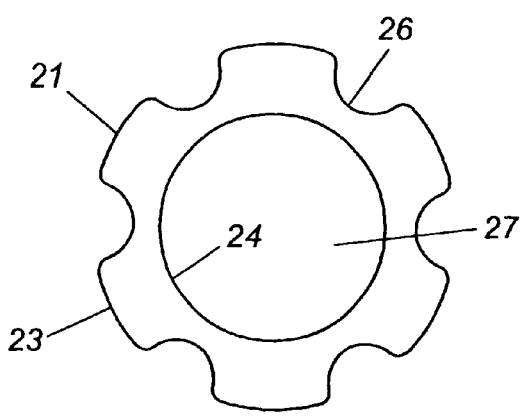
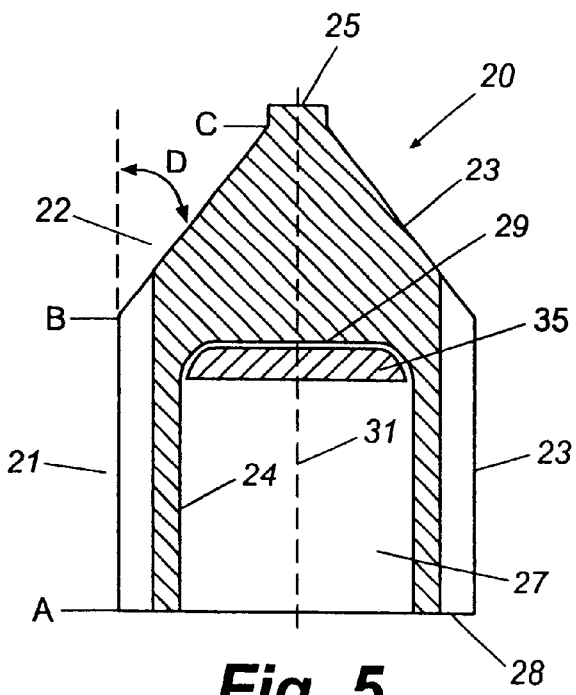
Fig. 4
Fig. 5

SILICON CARBIDE VALVE DISC FOR NUCLEAR REACTORS

BACKGROUND OF THE INVENTION

1. Field of the Invention

The present invention relates generally to noncorrosive steam pressure safety release valves, and more particularly, to a valve head for use in power generating nuclear fission reactor plants and associated equipment.

2. Description of the Prior Art

Steam pressure relief valves are critical devices in any type of high pressure, hot water, or steam producing units. In a nuclear power plant there are standards and demands that must be applied to the design and fabrication of such valves. The function of the steam pressure relief valve is shown conceptually in the illustration of FIG. 1. The principles of nuclear power generation are well established and understood. The nuclear reactor 10 is located in a containment building 11 and contains uranium or plutonium fuel elements in a core arrangement. Through neutron absorption and nuclear fission (chain reaction) of the uranium or plutonium, large amounts of energy are released in the form of heat which is utilized to generate electricity.

In a boiling water reactor, the chain reaction boils the moderator-water in the core. Steam is thus produced inside the reactor 10. Steam pipes 12 carry the steam from the reactor 10 to the turbines 13. In producing electricity, a nuclear plant's steam turbines and electric generators work like those in a fossil fuel plant. The steam produced by a reactor spins the blades of the plant's turbines 13, which drive the generators. Many plants have combination turbines and generators called turbogenerators.

After steam has passed through a plant's turbines 13, it is piped to a condenser 14. The condenser 14 changes the steam back into water 15. Water 15 is then returned to reactor 10 by pump 16. There are several conditions that may occur in the nuclear plant which require a relief of steam pressure from the system. For this reason, a steam relief safety valve 17 is used in the steam pipe system. The purpose of the valve 17 generally is to relieve steam pressure in excess of 1150 pounds per square inch ("psi") to prevent overpressurization of the nuclear reactor and subsequent damage and potential shut down. This overpressure could be caused by several events such as a main electrical breaker closure which eliminates the resistance to the power turbines, or any misadventure that might cause overpressure with subsequent excessive revolutions per minute ("rpm") of the turbines. To prevent excessive rpm to the turbines, the steam power to them is shut down with the pressure then traveling back to the reactor. The valve 17 is designed to then exhaust the excess steam above 1150 psi.

The present invention relates to two-stage safety relief valves as part of the nuclear pressure relief system in boiling water reactors to provide automatic depressurization, if needed, for breaks in the nuclear system so that the low pressure coolant injection and the core spray systems can operate to protect the fuel barrier. This two-stage valve is referred to as a main steam relief valve which is installed in the main steam lines. The main steam relief valves are distributed among the four main steam lines so that an accident cannot completely disable a safety, relief, or automatic depressurization function. Of the nuclear plants that use this valve, each reactor (typically 2–3 per plant) has approximately thirteen of these valves along the main steam line.

The typical main steam relief valve contains a valve head which engages a seat when the valve is in the closed position. The valve head and seat are presently made of stellite, a cobalt-based metal containing chromium and carbon. The main problem for the nuclear energy plant is risk of overpressure to the nuclear reactor because of the occasional failure of the main steam relief valve to relieve at the designated pressure. This condition is due to corrosion bonding of the stellite valve head to the stellite seat as a result of exposure to radiation, heat, moisture, and oxygen from the steam. Plating the valve head with platinum has improved the function of the valve head but has not cured the problem of corrosion and bonding of the valve to the seat.

Valve heads made of ceramics might be resistant to this corrosive and bonding effect in nuclear plants. However, oxide-based ceramics would not be useful because the presence of oxide causes the ceramic to easily corrode in the presence of oxygen, high temperatures, alkalis, and acids. On the other hand, silicon carbide ceramic is known to be highly resistant to corrosion under extreme conditions. However, it is a complicated process to sinter silicon carbide because it has to be sintered at high temperatures in an inert atmosphere. The stellite valve head in present use in nuclear reactors has a complex shape which would make construction of a similar valve out of silicon carbide highly impractical. The stellite valve head has a conical shape on one end and a cylindrical shape on the opposite end. The cylindrical portion has three different external diameters and two different internal diameters which would make the construction of this valve from silicon carbide unfeasible. To my knowledge, no alternative valve head composed of silicon carbide has ever been made available for a nuclear power plant heretofore.

The present invention has solved these and other shortcomings by providing a silicon carbide valve head for use in a main steam relief valve. The cylindrical portion of this valve head has a uniform external diameter and a uniform internal diameter and is feasible to construct entirely from silicon carbide or similar carbide ceramics.

SUMMARY OF THE INVENTION

One aspect of the present invention relates to a main steam relief valve for use in a boiling water reactor nuclear power plant. In particular, the valve of the present invention is a valve for regulating steam pressure in a nuclear power plant, comprising: a hollow valve head including a cylindrical first end having a uniform external and internal circumference, a conical opposite end, an external surface, and an internal surface, said conical portion adapted to receive a push-rod on the internal surface and a valve seat on the external surface, wherein said valve head comprises a ceramic carbide. The valve head has a cylindrical first end of uniform external and internal circumference, a conical opposite end, an external surface, and an internal surface. The cylindrical first end has a plurality of grooves on the external surface to prevent rotation of the valve head and to allow steam to exhaust. The conical portion is highly polished on the external surface to prevent the formation of cracks. The conical portion is adapted to receive a push-rod or a steel plate and push-rod on the internal surface, and a valve seat on the external surface. The valve head is constructed entirely of 90% or greater oxide-free silicon carbide, boron carbide, titanium diboride, or boron nitride. The valve head is highly resistant to destruction by physical impact by virtue of the thickness of its walls and its conical portion. In a preferred embodiment, the valve head is constructed from superfine powders of silicon carbide, hot pressed to rough shape, premachined, sintered at high temperature, diamond wheel ground, and polished.

An advantage of the present invention is to provide a valve head for a nuclear power plant that is resistant to corrosion during operation of the nuclear power plant.

Another advantage of the present invention is to provide a valve head for a nuclear power plant which will not bond to its valve seat during operation of the nuclear power plant.

Another advantage of the present invention is to provide a valve head for a nuclear power plant that is resistant to destruction by physical impact.

Yet another advantage of the present invention is to provide a valve head for a nuclear power plant that is constructed of silicon carbide, boron carbide, titanium diboride, or boron nitride with purity of 90% or greater.

BRIEF DESCRIPTION OF THE DRAWINGS

FIG. 2 is a perspective view of the silicon carbide valve head of the present invention.

FIG. 3 shows a diagrammatic view of the valve head in a valve assembly, with the valve head in place on a valve seat.

FIG. 4 is a horizontal cross-sectional view of the valve head of FIG. 2.

FIG. 5 is a vertical cross-sectional view of the valve head of FIG. 2.

DETAILED DESCRIPTION OF THE PREFERRED EMBODIMENTS

Figure 1:
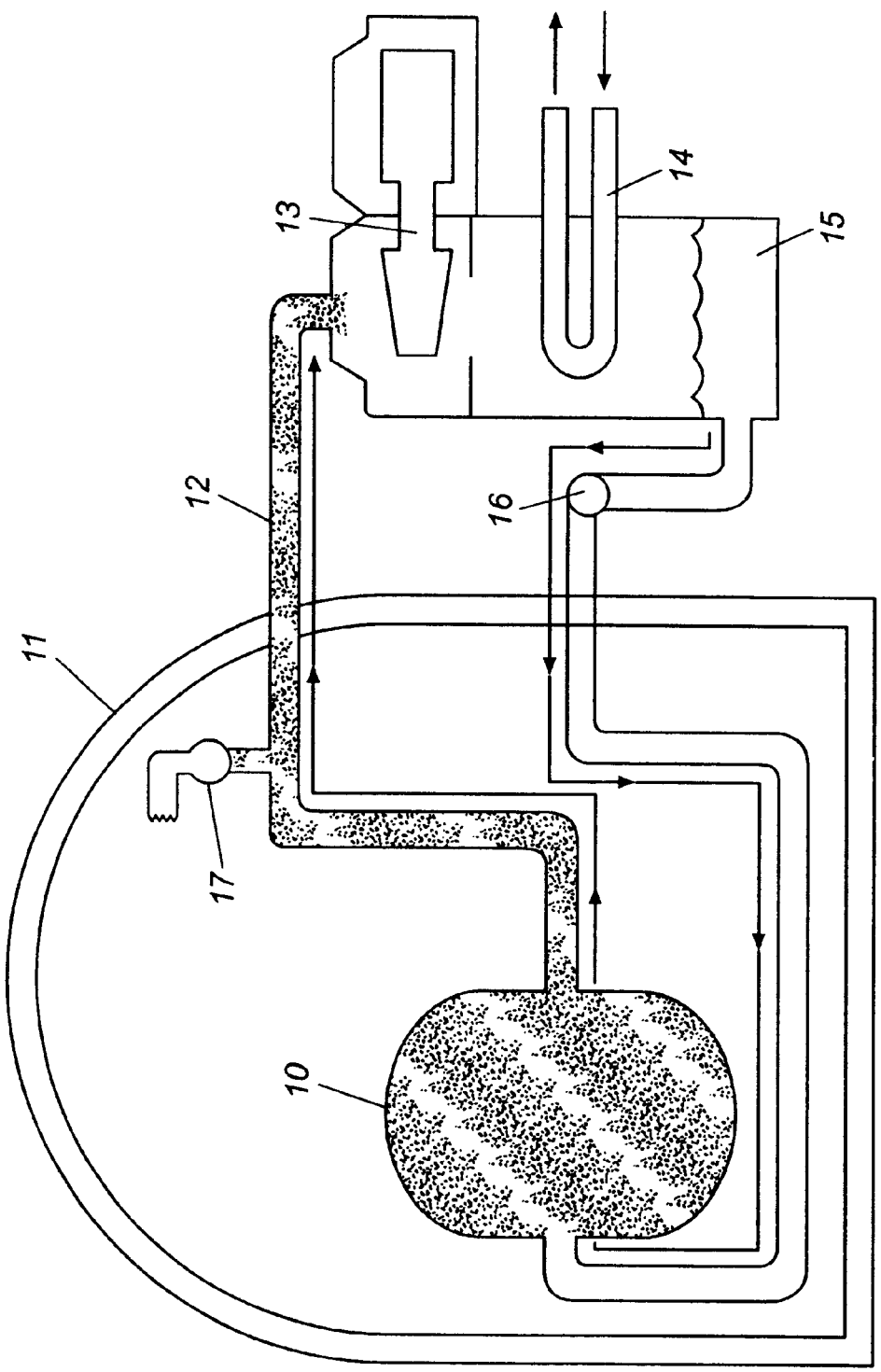
FIG. 1 is a diagrammatic view of a typical boiling water reactor in a nuclear power plant, known in the art showing the placement of the main steam release valve.

FIG. 1 is a diagrammatic view of a typical boiling water reactor showing the placement of the main steam release valve. FIG. 2 shows a perspective view of an exemplary embodiment of a valve head in accordance with the present invention. The valve head 20 has a cylindrical first end 21 and an opposite conical end 22. The valve head is hollow so that it will have an exterior surface 23 and an interior surface 24 (see FIGS. 4 and 5). The tip 25 of conical end 22 is a nipple or papilla-like structure to facilitate seating of the valve head 20 within the valve. Surface 23 of cylindrical end 21 has a uniform circumference. Conical end 22 forms an approximate 71° flair with the external surface 23 of cylindrical end 21, ranging between about 60°–80°. Cylindrical end 21 has a plurality of grooves 26 in exterior surface 23, which accommodate projections within the valve to keep the valve head aligned, prevent the valve head from rotating about its longitudinal (vertical) axis 31 (see FIG. 5) when in use, and allow steam to exhaust to relieve pressure.

FIG. 3 shows valve head 20 in a main steam relief valve 30 in place against valve seat 31 on conical exterior surface 22, thereby closing the valve. The arrows indicate the direction of steam flow if the valve were open. Plunger or push-rod 33 fits within the hollow portion 27 (see FIG. 5) so that it can push valve head 20 onto valve seat 31 with whatever force is required. When steam pressure exceeds a certain value, thereby exceeding the force of the plunger, it pushes the valve head 20 away from valve seat 31, opening the valve and allowing steam to escape.

FIG. 4 shows a horizontal cross-sectional view of the valve head 20 of FIG. 2. The walls of the cylindrical first end 21 are defined by the internal surface 24 and external surface 23. The maximum external diameter of cylindrical first end 21, defined by the circumference of the external surface 23, is approximately 1.752 inches, ranging between 1.0 and 2.5 inches. This diameter and circumference are uniform along the length of cylindrical end 21. The internal diameter of cylindrical first end 21 is approximately 1.12 inches, ranging between 0.8 to 1.6 inches. Internal surface 24 of cylindrical end 21 has a uniform circumference along the length of cylindrical end 21. Likewise, the corresponding internal diameter is uniform. Maximum wall thickness of the cylindrical first end 21 is approximately 0.316 inches, ranging between 0.16 and 0.8 inches. The minimum wall thickness, measured from the center of groove 26, is approximately 0.16 inches, ranging from 0.08 to 0.4 inches.

FIG. 5 shows a vertical cross-sectional view of the valve head 20 of FIG. 2. Cylindrical first end 21 has a base 28 and opposite conical end has a tip 25. The internal or hollow portion 27 of the valve head is contained within the cylindrical end 21. Conical end 22 is solid so that a flat dome or roof 29 is formed in the internal hollow portion 27. A soft circular steel plate 30 can be reversibly inserted into hollow portion 27 and placed adjacent to inner surface 24 at dome 29 in between said dome 29 and said push-rod 33 to spread impact load uniformly and to reduce fracture stress from push-rod 33. The length of the longitudinal axis 31 of valve head 20, extending from base 28 to tip 25 is approximately 2.5 inches, ranging between 1.8 to 3.3 inches. The thickness of the opposite conical end 22 from the external tip 25 to the internal flat dome 29 is approximately 1.28 inches, ranging between 1.0 and 2.0 inches. Internal dome 29 is adapted to accept push-rod 33 (see FIG. 3) or flat plate 30 interposed between push-rod 33 and internal dome 29. The length of cylindrical first end 21, denoted by the letters A and B, is approximately 1.39 inches, ranging between 0.6 and 1.8 inches. The angular length of opposite conical end 22, denoted by the letters B and C, is approximately 1.28 inches, ranging from 0.55 to 1.73 inches. The height of tip 25 is approximately 0.09 inches, ranging from 0 to 0.2 inches, and the diameter of the tip is approximately 0.283 inches, ranging from 0.12 to 0.35 inches. The diameter of circular steel plate 30 is approximately 1.0 inches, ranging between 0.7 and 2.3 inches. The thickness of steel plate 30 is 0.2 inches, ranging between 0.1 and 0.3 inches. The angle D formed between cylindrical first end 21 and opposite conical end 22 is about 71°, ranging between 60°–80°.

The valve head of the present invention is composed of and fashioned from ceramic carbide, preferably from 98.0% (wt %) silicon carbide (SiC), or boron carbide, titanium diboride, or boron nitride, which contain trace amounts of other metals, and which are available commercially, for example, from The Carborundum Corporation (Niagara Falls, N.Y.) or AC Cerama (Sweden). The sintering process results in a single-phase, fine-grain silicon carbide product that is very pure and uniform, with virtually no porosity. The material is extremely durable, whether submerged in corrosive environments, subjected to extreme wear and abrasive conditions, or exposed to temperatures in excess of 1400° C. This silicon carbide, as well as the other carbides disclosed, are among the hardest, yet strongest, high performance materials available, second only to diamonds (2800 kg/mm$^2$ at room temperature), and have excellent resistance to creep and stress rupture at temperatures up to 1,650° C. They resist corrosion, oxidation and erosion. The high density, low porosity and chemical inertness of these carbides permit them to function in environments of hot gases and liquids, in oxidizing and corrosive atmospheres, in strong acids and bases, even at extremely high temperatures, and in exposure to high radioactivity.

Although the valve head is fashioned preferably from 98% (wt %) silicon carbide, lesser purity may be used ranging from 90% and higher. The valve head is fashioned from superfine silicon carbide powders, hot pressed to rough shape, premachined, and sintered at high temperature under conditions well-known in the art. The valve head is then diamond-wheel ground in successively fine (diamond gait size) wheels and final ground by polishing (successively fine grit and polishing papers and cutting fluids). The valve head is then exposed to another heat treatment, between 1,500 and 3,000° F., preferably at 2,500° F., for 6 to 12 hours, preferably eight hours, followed by polishing with clear oil, such as, for example, standard commercial baby oil, and with paper tissue, such as, for example, bathroom tissue (toilet paper) or facial tissue.

The foregoing description has been limited to specific embodiments of this invention. It will be apparent, however, that variations and modifications may be made by those skilled in the art to the disclosed embodiments of the invention, with the attainment of some or all of its advantages and without departing from the spirit and scope of the present invention. For example, the longitudinal grooves in the cylindrical end may have various shapes to accommodate various interlocking mechanisms, or the cylindrical end may have no grooves. The amount and quantity of trace metals in the silicon carbide or other ceramic carbides may be varied. The internal dome may assume various shapes and forms to accommodate the head of a plunger or pushrod. The external tip on the conical end may take various shapes and sizes or be removed. The conical end may have a plurality of angles relative to the cylindrical end or be flat.

It will be understood that various changes in the details, materials, and arrangements of the parts which have been described and illustrated above in order to explain the nature of this invention may be made by those skilled in the art without departing from the principle and scope of the invention as recited in the following claims.

What is claimed is:

1. A hollow valve head for regulating steam pressure in a nuclear power plant, comprising:
   a) a cylindrical first end having uniform external and internal circumferences;
   b) a conical opposite end having a tip;
   c) an external surface and an internal surface;
   d) said external surface of said conical opposite end being polished to prevent the formation of cracks;
   e) the distance between said external surface and said internal surface ranging from about 0.16 to 0.8 inches;
   f) said internal surface having a dome, the distance between said dome and said tip of said opposite conical end ranging from about 1.0 to 2.0 inches; and
   g) said valve head being composed of approximately 90% or greater silicon carbide, boron carbide, titanium diboride, or boron nitride.

2. A valve head according to claim 1 wherein said valve head has a base at said cylindrical first end, the distance between said base and said tip ranging from about 1.8 to 3.3 inches.

3. A valve head according to claim 2 wherein said cylindrical first end includes a maximum external diameter ranging from about 1.0 to 2.5 inches, and an internal diameter ranging from about 0.8 to 1.6 inches.

4. A valve head according to claim 3 wherein said cylindrical first end and said conical opposite end form an angle comprising between about 60° to 80°.

5. A valve head according to claim 4 wherein said cylindrical first end and said conical opposite end form an angle of approximately 71°.

6. A valve head according to claim 4 said cylindrical first end has a plurality of grooves on said external surface.

7. A valve head according to claim 6 herein said tip has a height ranging from about 0.0 to 0.2 inches and a diameter ranging from about 0.12 to 0.35 inches.

8. A valve head according to claim 7 wherein said tip has a height of approximately 0.09 inches and a diameter of approximately 0.283 inches.

9. A valve head according to claim 3 wherein said maximum external diameter is approximately 1.752 inches and said internal diameter is approximately 1.12 inches.

10. A valve head according to claim 3 wherein the distance between said tip and said dome is approximately 1.28 inches.

11. A valve head according to claim 3 herein said conical portion has a circular steel plate on the internal surface.

12. A valve head according to claim 11 wherein the diameter of said circular steel plate ranges from about 0.7 to 2.3 inches.

13. A valve head according to claim 12 wherein the diameter of said circular steel plate is approximately 1.0 inches.

14. A valve head according to claim 11 wherein the thickness of said circular steel plate ranges from about 0.1 to 0.3 inches.

15. A valve head according to claim 14 wherein the thickness of said circular steel plate is approximately 0.2 inches.

16. A valve head according to claim 2 wherein the distance between said base and said tip is approximately 2.5 inches.

17. A valve head according to claim 2 wherein said distance between said external surface and said internal surface is approximately 0.316 inches.

18. A hollow valve head for regulating steam pressure in a nuclear power plant, comprising:
   a) a cylindrical first end of uniform external and internal circumferences, a conical opposite end, an external surface, and an internal surface;
   b) a base at said cylindrical first end and a tip at said conical opposite end, the distance between said base and said tip ranging from about 1.8 to 3.3 inches;
   c) said external surface and said internal surface defining walls of said cylindrical first end, said walls having a maximum thickness ranging from about 0.16 to 0.8 inches;
   d) said cylindrical first end having a maximum external diameter ranging from about 1.0 to 2.5 inches and an internal diameter ranging from about 0.8 to 1.6 inches;
   e) said internal surface having a dome, the distance between said tip and said dome ranging from about 1.0 to 2.0 inches;
   f) said cylindrical first end and said conical opposite end forming an angle comprising between about 60° and 80°;
   g) said cylindrical first end having a plurality of grooves on said external surface;
   h) said tip having a height ranging from about 0.0 to 0.2 inches and a diameter ranging from about 0.12 to 0.35 inches;
   i) said external surface of said conical opposite end being polished to prevent the formation of cracks; and
   j) said valve head being composed of approximately 90% or greater silicon carbide, boron carbide, titanium diboride, or boron nitride.

19. A valve head according to claim 18 wherein the distance between said base and said tip is approximately 2.5 inches.

20. A valve head according to claim 19 wherein said walls have a maximum thickness of approximately 0.316 inches.

21. A valve head according to claim 20 wherein said maximum external diameter is approximately 1.752 inches and said internal diameter is approximately 1.12 inches.

22. A valve head according to claim 21 wherein the distance between said tip and said dome is approximately 1.28 inches.

23. A valve head according to claim 22 wherein said tip has a height of approximately 0.09 inches and a diameter of approximately 0.283 inches.

24. A valve head according to claim 18 wherein said conical portion has a circular steel plate on the internal surface.

25. A valve head according to claim 24 wherein the diameter of said circular steel plate ranges from about 0.7 to 2.3 inches.

26. A valve head according to claim 25 wherein the diameter of said circular steel plate is approximately 1.0 inches.

27. A valve head according to claim 24 wherein the thickness of said circular steel plate ranges from about 0.1 to 0.3 inches.

28. A valve head according to claim 27 wherein the thickness of said circular steel plate is approximately 0.2 inches.

* * * * *